(12) United States Patent
Fukuhara et al.

(10) Patent No.: US 8,013,901 B2
(45) Date of Patent: Sep. 6, 2011

(54) IMAGING APPARATUS AND A CAMERA FOR VEHICLES

(75) Inventors: Masaaki Fukuhara, Mito (JP); Isao Furusawa, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 904 days.

(21) Appl. No.: 10/964,808

(22) Filed: Oct. 15, 2004

(65) Prior Publication Data

US 2005/0117027 A1  Jun. 2, 2005

(30) Foreign Application Priority Data

Oct. 16, 2003  (JP) .................. 2003-355777

(51) Int. Cl.
*H04N 5/228* (2006.01)
*H04N 9/64* (2006.01)

(52) U.S. Cl. ..................... 348/222.1; 348/248

(58) Field of Classification Search .......... 348/364, 348/340, 208.1; 355/61
See application file for complete search history.

(56) References Cited

U.S. PATENT DOCUMENTS

| | | | |
|---|---|---|---|
| 5,047,847 A * | 9/1991 | Toda et al. ............ 348/68 |
| 5,047,848 A * | 9/1991 | Krauter ............ 348/82 |
| 5,387,958 A * | 2/1995 | Pashley ............ 396/457 |
| 5,479,298 A | 12/1995 | Yanagi et al. | |
| 5,523,811 A * | 6/1996 | Wada et al. ............ 396/429 |
| 5,892,573 A * | 4/1999 | Takahashi et al. ............ 355/61 |
| 6,771,315 B1 * | 8/2004 | Nanjo et al. ............ 348/362 |
| 6,952,314 B2 * | 10/2005 | Yanagi et al. ............ 359/888 |
| 7,199,830 B1 * | 4/2007 | Tanaka et al. ............ 348/362 |
| 7,245,325 B2 * | 7/2007 | Yamaguchi ............ 348/364 |
| 7,365,791 B2 * | 4/2008 | Ikeda ............ 348/363 |
| 2004/0223075 A1 * | 11/2004 | Furlan et al. ............ 348/363 |

FOREIGN PATENT DOCUMENTS

| | | |
|---|---|---|
| EP | 0 957 634 A2 * | 5/1999 |
| EP | 0957634 A2 * | 5/1999 |
| EP | 0957634 * | 11/1999 |
| EP | 0957634 A2 * | 11/1999 |
| EP | 0957634 A2 * | 11/1999 |
| JP | 6-75977 | 3/1994 |
| JP | 09214827 | 8/1997 |
| JP | 0 957 634 A2 * | 5/1999 |
| JP | 11-331712 | 11/1999 |
| JP | 2000-352736 A | 12/2000 |
| JP | 2000352736 | 12/2000 |
| JP | 2003-78787 A | 3/2003 |
| JP | 2003-241253 A | 8/2003 |

OTHER PUBLICATIONS

Japanese office action dated Oct. 21, 2008 with English translation.

* cited by examiner

*Primary Examiner* — Lin Ye
*Assistant Examiner* — Trung Diep
(74) *Attorney, Agent, or Firm* — Crowell & Moring LLP

(57) ABSTRACT

A camera apparatus for vehicles including an imaging element and a lens comprises a gradation generation unit for stepwise changing the light amount reaching a whole or part of the imaging element. By this, a gradation region is formed on the imaging element and it absorbs assembling errors during manufacturing and positional shifts attributed to a road surface slope or the like. Even when an inverse light state is caused, it is possible to improve the image processing performance with an ecconomical configuration.

12 Claims, 4 Drawing Sheets

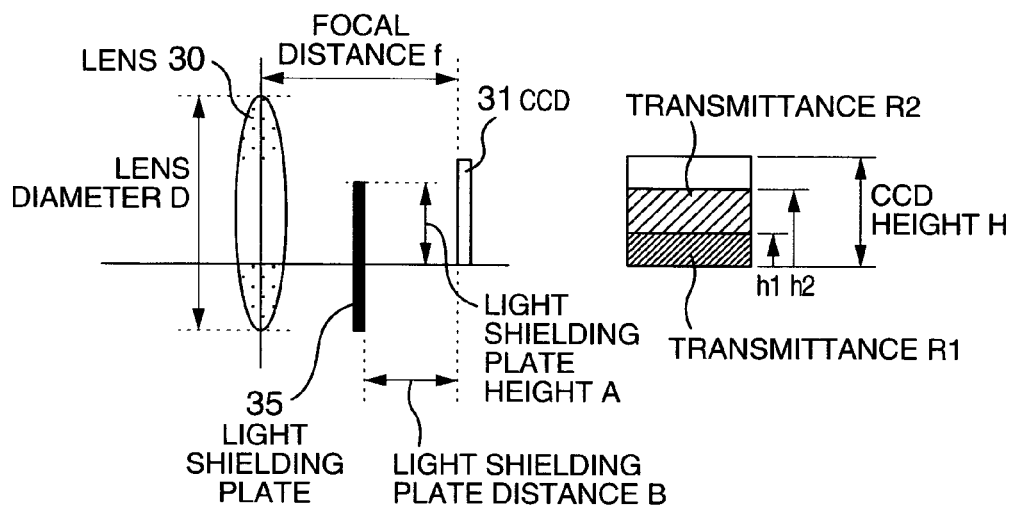

IMAGING APPARATUS AND A CAMERA FOR VEHICLES

BACKGROUND OF THE INVENTION

This invention relates to an imaging apparatus and a camera for vehicles.

Recently, an imaging apparatus is mounted on a vehicle and by using the image information imaged, control is performed so as to support a driver's driving operation and reduce driver's fatigue.

In the imaging element such as CCD used for the imaging apparatus for vehicles, when light of high luminance comes in, a charge amount limit that one pixel can accumulate (saturation capacity) is exceeded, and a phenomenon occurs that electric charge overflows in the signal acquisition direction. For this, when a high-luminance object is imaged, a low-luminance portion around a high-luminance object is also imaged brightly (blooming phenomenon) and a bright belt appears in a vertical direction of the high-luminance object (smear phenomenon). These phenomena become noises significantly disturbing the video, losing necessary information, and reducing the processing accuracy in the image processing. In the imaging apparatus for vehicles, such phenomena often occur at a sun inverse light in the morning and evening and the video is disturbed as shown in FIG. 2.

As a conventional technique to cope with the afore-mentioned problems, the camera apparatus includes a inverse light sensor unit, a filter drive unit and a filter control unit. When the inverse light sensor unit detects an incident state of a high-luminance light source within the imaging image range, i.e., the inverse light state, the filter unit is driven to cut off the high-luminance direct incident light (JP-A-6-75977) or a CCD element is offset toward a top with respect to the focusing range of the optical system so that a sun light is focused outside a use range of the CCD element, thereby obtaining an image with little smear (JP-A-11-331712).

SUMMARY OF THE INVENTION

However, in the technique of JP-A-6-75977, a motor for driving the filter unit and the inverse light sensor (photodiode) are required to increase the number of components as compared to an ordinary imaging apparatus for vehicles. That is, there arises a problem that the apparatus size is increased and the cost is increased. Moreover, the mechanical part having a movable portion such as a motor has a problem in reliability for vibration as a device for vehicles. Moreover, a movable portion causes a problem in maintenance.

Moreover, in JP-A-11-331712, since only a part of CCD is a used area as an offset with respect to the imaging range of the optical system, when a vehicle runs on a slope, a high-luminance object such as the sun is focused in a used area of the CCD, causing smear and there is a problem that an image of a road surface is focused in a non-used area of the CCD. This invention intends to solve the afore-mentioned problems and improve the performance of the camera apparatus for vehicles.

The camera apparatus for vehicles having an imaging element and a lens further includes a gradation generation unit for stepwise differentiating the light quantity reaching to a whole or part of the imaging element.

It is possible to improve the image processing performance with an ecconomical configuration without being affected by smear or blooming even in the inverse light condition Moreover, even when there is an assembling error in manufacturing, or a horizontal positioning shift is caused in the imaging area due to a road surface slope, it is possible to obtain the afore-mentioned effect of improving the image processing performance.

Other objects, features and advantages of the invention will become apparent from the following description of the embodiments of the invention taken in conjunction with the accompanying drawings.

BRIEF DESCRIPTION OF THE DRAWINGS

FIG. 10 shows a calculation example of dimension and position of a light shielding plate in an embodiment of this invention.

FIG. 11 shows a calculation example of dimension and position of a light shielding plate in an embodiment of this invention.

DESCRIPTION OF THE EMBODIMENT

Figure 1:
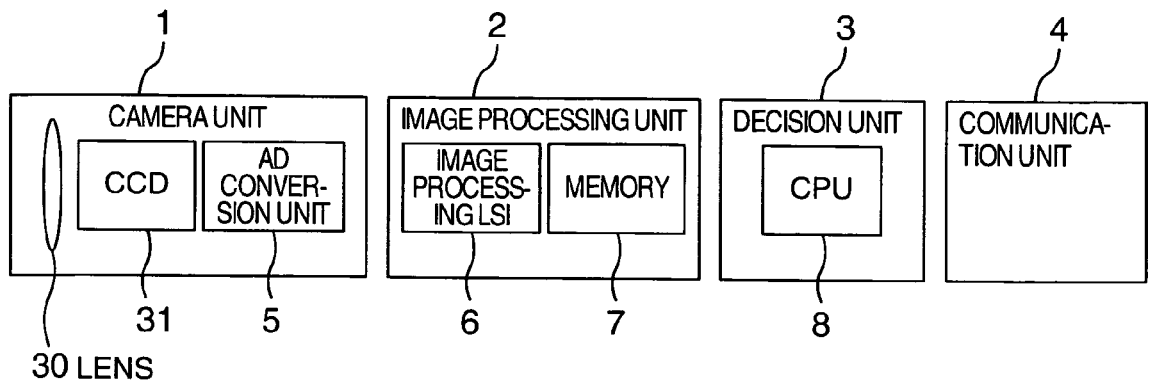
FIG. 1 is a block diagram of an imaging apparatus for vehicles.

Description will now be directed to an embodiment of this invention with reference to the attached drawings. FIG. 1 is a conceptual diagram of an ordinary imaging apparatus for vehicles. As shown in FIG. 1, the imaging apparatus for vehicles includes a camera unit 1 for imaging a road surface or the like, an image processing unit 2 for processing the data imaged by the camera unit, a decision unit 3 for deciding control of the vehicle from the image processing result, and a communication unit 4 for communication with a vehicle.

The camera unit includes imaging elements such as a lens 30 and a CCD 31 and an AD conversion unit 5 for performing digital conversion of an output signal of the imaging elements. The image processing unit 2 includes an image processing LSI 6 for performing image processing of imaging data and a memory 7 for storing data such as imaging data and imaging data subjected to image processing. The decision unit 3 includes a CPU 8 for calculating a vehicle control value for controlling a vehicle from the image processing result of the image processing unit 2 and making a decision whether the vehicle is controlled. The communication unit 4 reports the vehicle control value calculated by the decision unit 3 and the vehicle control decision result to a communication unit of the vehicle.

FIG. 2 to FIG. 5 show imaging areas imaged via the lens 30 and the CCD 31 when the imaging lens for the vehicle is mounted so as to face a front of the vehicle. It is to be noted that according to the characteristic of the lens 30 and the positional relationship with the CCD 31, there is a case that the image focused on the CCD 31 is reversed.

Figure 2:
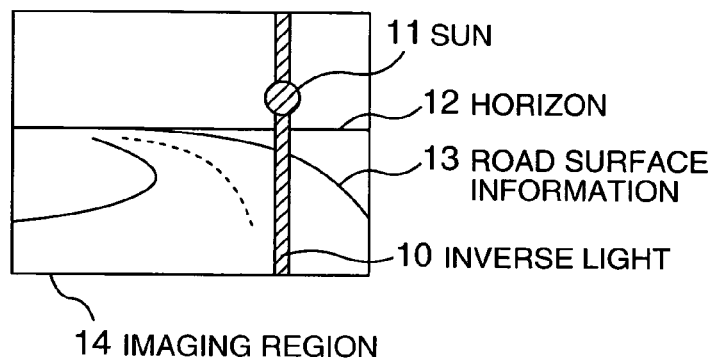
FIG. 2 shows an image where smear which is caused in the inverse light state in the conventional imaging device for vehicles.

FIG. 2 shows an image obtained by a conventional imaging device for a vehicle in the inverse light state. When the sun 11 is in a camera view field, the imaging element at that portion is saturated and the smear phenomenon is generated. In this condition, road surface information 13 (such as a white line) required for vehicle control is lost and the accuracy of vehicle control may be lowered.

As shown in FIG. 2, the sun 11 causing the inverse light and causing loss of necessary information exists in a heaven direction from a horizon 12. Moreover, the road surface information 13 required for white line recognition and the like exists in a ground direction from the horizon 12. Furthermore, theoretically, a position of the horizon in the imaging element can be calculated from an angle defined by an optical axis of the imaging device for a vehicle and the road surface. Thus, by shielding the heaven direction from the position of the horizon 12 in the imaging region 14, it is theoretically possible to prevent loss of necessary information attributed to the inverse light.

Figure 3:
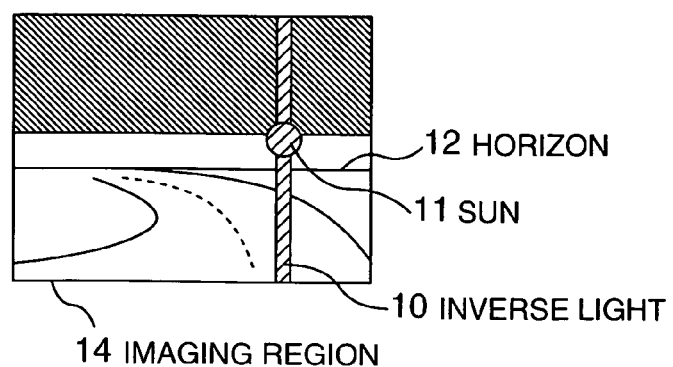
FIG. 3 shows an image example in which light shielding cannot be performed by a light shielding plate in imaging by the imaging apparatus for vehicles.
Figure 4:
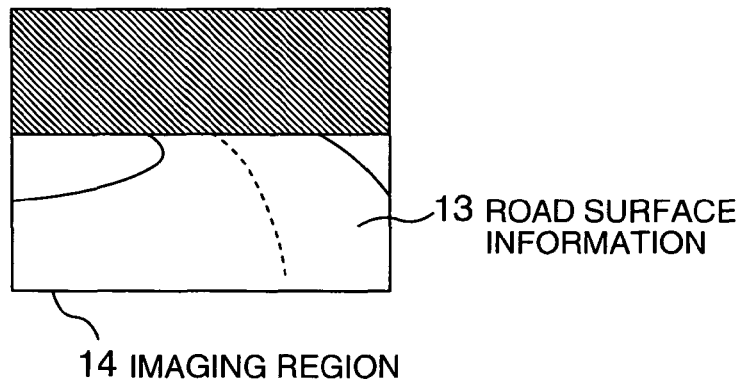
FIG. 4 shows an image example in which road surface information is lost in imaging by the imaging apparatus for vehicles.

However, the position of the horizon in the actual imaging element is changed as the slope is changed where the vehicle runs. For example, when the vehicle is running up a slope as shown in FIG. 3, the sun 11 comes out of a shielding region and a sun light reaches the imaging element. In this case, it is impossible to evade affect of the inverse light such as the smear phenomenon. When the vehicle is running down a slope as shown in FIG. 4, a portion lower than the horizon 12 is also shielded, which results in a black image of reaching light amount 0%, and there is a case that necessary road surface information is lost.

Moreover, a calculated position of the horizon 12 on the imaging element may be different from a position of the horizon in the actual imaging element depending on a mounting method of the imaging device for a vehicle onto the vehicle body, an assembling error in manufacturing the imaging device for vehicles, or irregularities of the material dimensions. For example, when a 270,000-pixel CCD has ⅓-inch optical size. a distance between adjacent pixels in a vertical direction is about 0.01 mm. Even when the dimension error due to assembling and materials is reduced to #0.2 mm, 40 pixels are shifted in a vertical direction at a maximum and there is a case that a region equivalent to ¹/₁₀ of the screen cannot be shielded.

Figure 5:
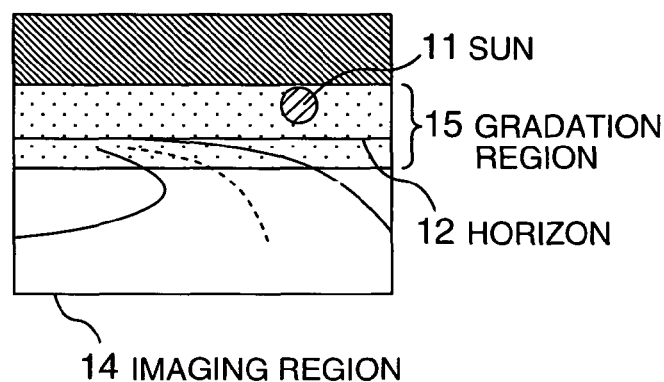
FIG. 5 shows an image example having a gradation area in imaging by the imaging apparatus for vehicles.

To cope with this, in this embodiment, the position of the horizon 12 in the imaging region 14 is defined assuming that the road surface slope is constant and the assembling error in manufacturing is 0. As shown in FIG. 5, in certain portions in the heaven direction and the ground direction from the horizon 12, there is generated a gradation region 15 where the amount of light reaching the imaging region is stepwise changed.

A gradation region 15 is such that the amount of light reaching the imaging element in the heaven direction is reduced while the amount of light reaching the imaging element in the ground direction is increased. Thus, even when the horizon 12 on the imaging element moves up and down due to the road surface slope, the sun 11 remains in the gradation region 15. Accordingly, it is possible to reduce the light amount of the sun 11 reaching the imaging element and to reduce the affect of inverse light such as the smear phenomenon. Moreover, even when the horizon 12 on the imaging element moves up and down due to the road surface slope or the like, the necessary road surface information 13 such as the white line remains in the gradation region 15. Thus, as compared to the case of merely providing a light shielding portion, it is possible to reduce the loss of information. That is, the gradation region 15 absorbs the position shift of the horizon 12 in the imaging area 14 due to the assembling error in manufacturing and the road surface slope.

It is to be noted in the morning and the evening when the inverse light is easily generated, the sun 11 is at a low position near the horizon. The sun at such a position is comparatively dark. Accordingly, by reducing the light amount reaching the imaging element by the gradation region 15, it is possible to prevent generation of the smear phenomenon and the blooming phenomenon even without performing light shielding.

The gradation region may have such a configuration that the light amount reaching from one end to the other of the imaging element is continuously changed or that the imaging element is divided into several areas and the light amount reaching is stepwise changed. Moreover, there is no need of setting the gradation region over the entire imaging element. The gradation area may be generated on a part of region of the imaging element while the light transmittance is set to a constant value on the other portion.

Figure 6:
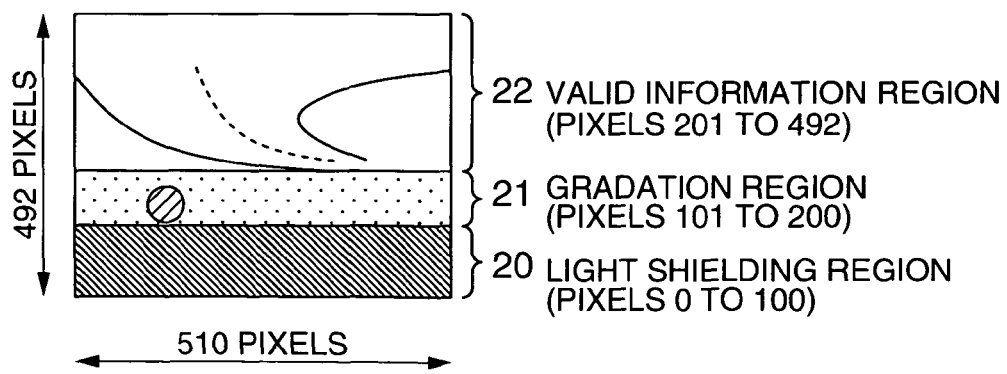
FIG. 6 shows an imaging element and an image for explaining an embodiment of this invention.

Hereinafter, a specific embodiment of this invention will be explained using an example of a 510 (H)×492 (V) CCD imaging element having 250,000 effective pixels as shown in FIG. 6. In FIG. 6, a lower end of the CCD is pixel 0 and an upper end is pixel 492. It is to be noted that the image focused by the CCD is reversed by the characteristic of a convex lens. Accordingly, the sun light at a high position normally appears at the lower position of the CCD.

In this embodiment, the region from the bottom to the pixel 100 is made a shielding region 20 where the reaching light amount is 0%. The region from the pixel 101 to the pixel 200 is made a gradation region 21 where the reaching light amount is stepwise varied from 0% to 100%. The region from the pixel 200 to the pixel 492 is made a valid information region 22 where the reaching light amount is 100%. By setting the regions in this way, it is possible to suppress generation of the smear phenomenon and the blooming phenomenon and reduce the loss of necessary information.

Moreover, in this embodiment, the light transmittance ratio is changed upward and downward in the state of being mounted on a vehicle, and no change is caused in the direction corresponding to the vertical direction.

It is to be noted that numerical values in this embodiment are only an example and different values can be set according to the environment where the imaging device for vehicles is used. For example, in the region of low latitude, the inverse light state does not occur often and the gradation region 21 may be narrowed. On the other hand, in the region of high latitude, the gradation region 21 may be broadened. Moreover, in the region of plenty of light amount such as in a desert, the reaching light amount of the valid information region 22 may be a value lower than 100%.

In order to adjust the light amount reaching the arbitrary region of the CCD as described above, as shown in FIG. 7 and FIG. 8, a distance from the imaging surface of the light shielding plate filter is set. The focal point position is decided by the angle of view of the lens 30 and the optical size of the CCD 31. the positional relationship between the lens 30 and the CCD 31 is fixed. The light source explained below may apply direct light or reflected light.

Figure 7:
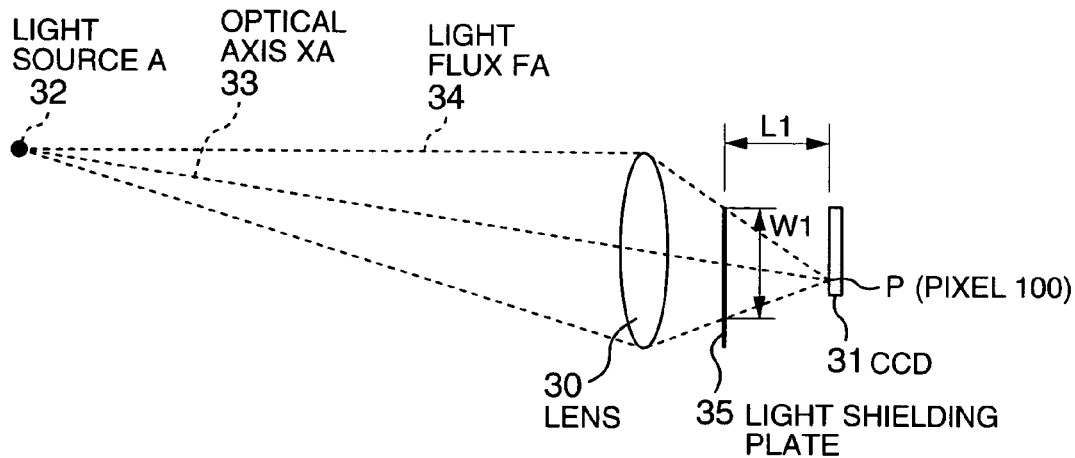
FIG. 7 shows an embodiment of this invention.

In FIG. 7, the light focusing at a position P (100-th pixel) on the imaging screen of the CCD 31 is emitted from the light source A32 and forms optical axis XA33 and light flux FA34. The light amount reaching the position P on the imaging screen of the CCD 31 is decided by a ratio of shielding of the light flux FA34. For example, when a position of the light shielding plate 35 is at L1 and 100% of the range W1 of the light flux FA34 is shielded, the light amount reaching the position P on the imaging screen from the light source A32 is 0.

Figure 8:
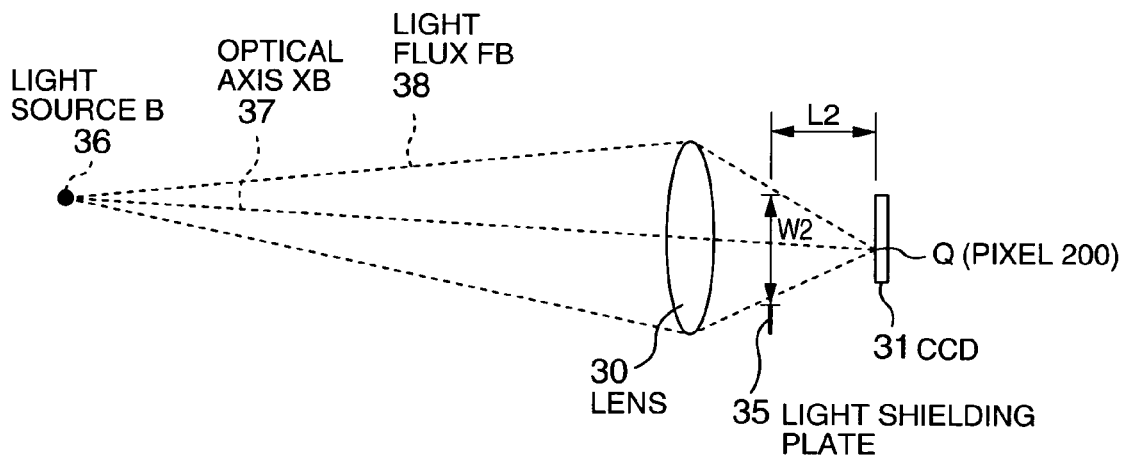
FIG. 8 shows an embodiment of this invention.

In FIG. 8, the light focusing at a position Q (200-th pixel) on the imaging screen of the CCD 31 is emitted from the light source A36 and forms optical axis XB37 and light flux FB38. The light amount reaching the position Q on the imaging screen of the CCD 31 is decided by a ratio of shielding of the light flux FB38. For example, when the position of the light shielding plate 35 is at L2 and 0% of the range W2 of the light flux FB38 is shielded, the light amount reaching the position Q on the imaging screen from the light source A36 is 100%.

Figure 9:
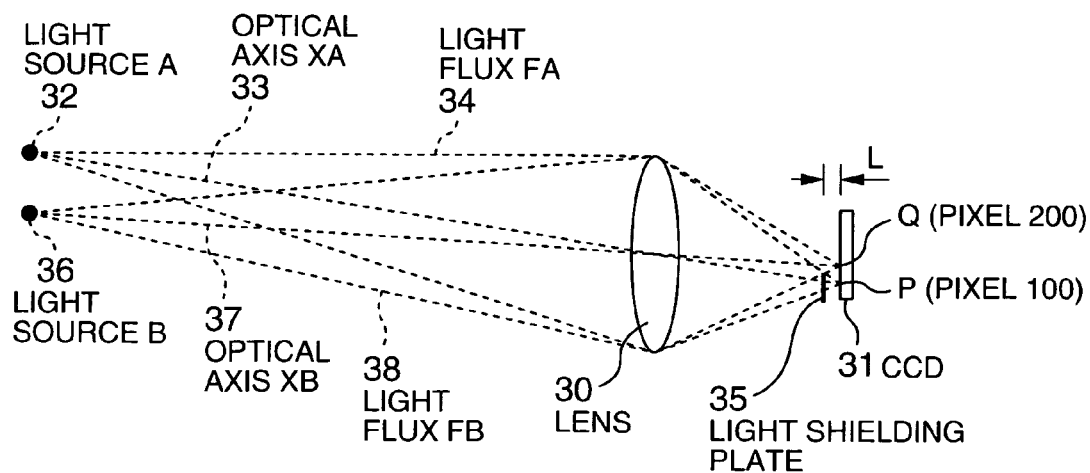
FIG. 9 shows an embodiment of this invention.

In FIG. 9, conditions of FIG. 7 and FIG. 8 are superimposed. The optical axes and the light fluxes of the light source A32 and the light source B36 are shown in FIG. 9. The light shielding plate 35 is set so as to simultaneously satisfy the condition that the light from the light source A32 is 0 and the light from the light source B36 is 100%. The light shielding plate 35 is at a distance L from the CCD 31 shields 100% of the light flux FA34 from the light source A32 and 0% of the light flux FB38 from the light source B36. Thus, the reaching light amount of the light focusing on the pixels 0 to 100 of the CCD 31 is 0% and the reaching light amount of the light focusing on the pixels 201 to 492 is 100%. The light flux reaching to the pixels 101 to 200 is shielded stepwise, serving as a gradation region. By this embodiment, it is possible to create a gradation region on the CCD 31 by the position and size of the light shielding plate 35 without using a special filter.

Next, explanation will be given on an example how to decide the size and the setting position of the light shielding plate 35 with reference to FIG. 10 and FIG. 11. In a camera apparatus having a lens 30 and a CCD 31 as shown in FIG. 10, when setting on the imaging screen of the CCD, transmittance R1 at a position of the coordinate h1 and transmittance R2 at a position of the coordinate h2, a height A of the light shielding plate 35 (shielding plate height based on the lower end of the CCD 31) and a distance B of the light shielding plate 35 from the CCD 31 (shielding plate distance) are obtained as a solution of the following simultaneous equations.

$$A = D \times B/f(1-R1) + ((D/2 - H/2 + h1) \times (f-B))/f$$

$$A = D \times B/f(1-R2) + ((D/2 - H/2 + h2) \times (f-B))/f \quad \text{Equation 1}$$

wherein D is a diameter of the lens 30, f is a focal distance, and H is a height of the CCD 31.

It is to be noted that when the light shielding plate 35 is a light reduction filter having a constant transmittance, the light amount reaching the imaging screen of the CCD 31 is R1×(transmittance of the light reduction filter) at the position of the coordinate h1 and R2×(transmittance of the light reduction filter) at the position of the coordinate h2.

FIG. 11 shows a calculation example of the size and the setting position of the light shielding plate 35. In this calculation example, the diameter of the lens 30 is 12 mm, the height H of the CCD 31 is 5 mm, the focal distance f is 9 mm, and the transmittance is 60% at the position of h1=0.5 mm and 90% at the position of h2=3.5 mm. When the shielding plate height A and the shielding plate distance B are calculated according to these numerical values, it is possible to obtain A=4.37 and B=4.091.

Explanation will be given on another embodiment of this invention. In the afore-mentioned embodiment, the gradation region is realized by the position and size of the light shielding plate 35. However, depending on the shape of the lens holder for fixing the positional relationship between the lens 30 and the CCD 31, there is a case that it is impossible to realize the position and size of the light shielding plate 35 as shown in the afore-mentioned embodiment. In such a case, the light shielding plate 35 may be replaced by an ND filter having transmittance of light forming a gradation region on the CCD 31. Furthermore, as another unit for generating gradation, a gradation sheet may be arranged in front of the CCD. In this embodiment, it is possible to provide an imaging apparatus having different gradation characteristics even in the same case.

It is to be noted that when mounting the camera apparatus for vehicles onto a vehicle, the camera apparatus for vehicles is set at such a position that the road surface in front of the vehicle comes into a field of view and at such a direction that in a whole or part of the imaging element, the ratio of the light incident in the lens reaching the imaging element is greater at the upper pixels. Furthermore, the camera apparatus is set in such a manner that the road surface in front of the vehicle is focused on the upper pixels of the imaging element. By mounting the camera apparatus in this way, the sun light during inverse light is shielded or attenuated by the gradation region before reaching the imaging element and the road surface information reaches the imaging element almost as it is. Thus, even in the inverse light state, it is possible to improve the image processing performance with an ecconomical configuration not affected by the smear or blooming. Moreover, even when an assembling error in the manufacturing is present or the horizontal position is shifted in the imaging region due to the road surface slope or the like, it is possible to improve the image processing performance since the probability of generation of the smear and blooming is lowered.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A camera apparatus for vehicles having an imaging element and a lens comprising:
   a gradation generation unit for passively stepwise changing an amount of light reaching a whole or part of the imaging element in a direction corresponding to an up and down direction,
   in which said gradation generation unit is a light shielding plate arranged between the imaging element and the lens;
   in which said gradation generation unit decides the concentration and area of the gradation according to the size and the position of the light shielding plate; and
   in which said gradation region is generated between a light shielding region where the light incident from the lens is substantially shielded and a valid information region where the light incident from the lens is transmitted substantially as it is, and when a horizon is defined in the imaging region, the amount of light reaching the imaging element is changed stepwise in a part region of upper side and lower side of the horizon, respectively.

2. A camera apparatus as claimed in claim 1, in which said gradation generation unit is an ND filter arranged between the imaging element and the lens.

3. A camera apparatus as claimed in claim 1, in which said gradation generation unit is a gradation sheet arranged in front of the lens.

4. A camera apparatus as claimed in claim 1, in which when said camera apparatus is mounted on a vehicle, the valid information region is positioned above the light shielding region.

5. An image processing apparatus for vehicles comprising:
a camera unit having an imaging element and a lens, and
an image processing unit for processing image data imaged by said camera unit, and
in which said camera unit comprises a gradation generation unit for passively stepwise changing the amount of light reaching a whole or a part of the imaging element in a direction corresponding to an up and down direction,
in which said gradation generation unit is a light shielding plate arranged between the imaging element and the lens;
in which said gradation generation unit decides the concentration and area of the gradation according to the size and the position of the light shielding plate; and
in which said gradation region is generated between a light shielding region where the light incident from the lens is substantially shielded and a valid information region where the light incident from the lens is transmitted substantially as it is, and when a horizon is defined in the imaging region, the amount of light reaching the imaging element is changed stepwise in a part region of upper side and lower side of the horizon respectively.

6. An image processing apparatus as claimed in claim 5, in which said gradation generation unit is an ND filter arranged between the imaging element and the lens.

7. An image processing apparatus as claimed in claim 5, in which said gradation generation unit is a gradation sheet arranged in front of the lens.

8. An image processing apparatus as claimed in claim 5, in which when said camera unit is mounted on a vehicle, the valid information region is positioned above the light shielding region.

9. An image processing apparatus as claimed in claim 5, in which said image processing unit uses pixel data having a coordinate of longitudinal direction greater or smaller than a predetermined value among pixels of the imaging element.

10. A camera apparatus for vehicles having an imaging element and a lens comprising: a gradation generation unit for stepwise changing an amount of light reaching a whole or part of the imaging element, wherein said gradation generation unit is permanently fixed relative to said imaging element and said lens, wherein said gradation generation unit generates a gradation region in between a light shielding region and a valid information region, and wherein when said camera apparatus is mounted on a vehicle, the valid information region is positioned above the light shielding region.

11. A camera apparatus for vehicles having an imaging element and a lens comprising: "a gradation generation unit for passively stepwise changing an amount of light reaching a whole or part of the imaging element, wherein said gradation generation unit is permanently fixed relative to said imaging element and said lens, wherein said gradation generation unit generates a gradation region in between a light shielding region and a valid information region, and wherein when said camera apparatus is mounted on a vehicle, the valid information region is positioned above the light shielding region."

12. An image processing apparatus for vehicles comprising: a camera unit having an imaging element and a lens, and an image processing unit for processing image data imaged by said camera unit, and in which said camera unit comprises a gradation generation unit for passively stepwise changing the amount of light reaching a whole or a part of the imaging element, and said image processing unit uses image data outputted from the part of the imaging element among the image data imaged, wherein said gradation generation unit is permanently fixed relative to said imaging element and said lens, wherein said gradation generation unit generates a gradation region in between a light shielding region and a valid information region, and wherein when said camera unit is mounted on a vehicle, the valid information region is positioned above the light shielding region.

* * * * *